United States Patent [19]
McDonald

[11] Patent Number: 5,894,392
[45] Date of Patent: Apr. 13, 1999

[54] POWER DISTRIBUTION UNIT WITH INDIVIDUAL GFI MODULES AND A LINE SUPERVISORY CIRCUIT

[75] Inventor: Thomas M. McDonald, Monroe, Conn.

[73] Assignee: Hubbell Incorporated, Orange, Conn.

[21] Appl. No.: 08/912,781

[22] Filed: Aug. 18, 1997

[51] Int. Cl.$^6$ ........................................ H02H 3/00
[52] U.S. Cl. ........................................ 361/42; 361/78
[58] Field of Search ........................ 361/42–50, 78, 361/84, 86, 88, 92; 307/127, 11, 28

[56] References Cited

U.S. PATENT DOCUMENTS

| | | | |
|---|---|---|---|
| 3,783,354 | 1/1974 | Fletcher et al. | 361/84 |
| 4,532,569 | 7/1985 | Salcedo | 361/76 |
| 5,418,678 | 5/1995 | McDonald | 361/46 |
| 5,786,971 | 7/1998 | Chan et al. | 361/42 |

OTHER PUBLICATIONS

"An easy guide to the Hubbell Spider", pp. 1–28.

*Primary Examiner*—Sally C. Medley
*Attorney, Agent, or Firm*—Jerry M. Presson; William C. Roch

[57] ABSTRACT

A power distribution unit for supplying temporary branch power has a 240–250 VAC input with input power line conductors L1 and L2, a neutral conductor N, and a ground conductor G. A supervisory circuit checks that the 240–250 VAC input is properly connected to the power distribution unit by requiring that the input voltage exceeds a supervisory circuit threshold voltage substantially greater than 120–125 volts. When that occurs, a contactor is enabled by the supervisory circuit to close first and second contacts therein to pass the 240–250 VAC on lines L1 and L2 therethrough to a 240–250 VAC ground fault interrupter protected circuit breaker outlet. A plurality of 120–125 VAC GFI module outlets are connected across either one of lines L1 and L2 at the output of the supervisory circuit and the neutral conductor N which bypasses the contactor. The supervisory circuit includes a diode bridge circuit connected across power line conductors L1 and L2 to convert a 240–250 VAC input to 240–250 VDC. A voltage threshold zener diode is connected in series with first and second relays across the 240–250 VDC, such that the zener diode ensures that the voltage required to operate the first and second relays is substantially greater than 120–125 VDC. The first relay operates contacts to activate the contactor, and the second relay operates contacts to bypass the neutral conductor N around the contactor.

12 Claims, 2 Drawing Sheets

POWER DISTRIBUTION UNIT WITH INDIVIDUAL GFI MODULES AND A LINE SUPERVISORY CIRCUIT

BACKGROUND OF THE INVENTION

1. Field of the Invention

The present invention relates generally to a power distribution unit with individual GFI modules and a line supervisory circuit, and more particularly pertains to a power distribution unit with individual GFI modules and a line supervisory circuit wherein individual outlets (120–125 VAC or 240–250 VAC) are protected by individual Ground Fault Interrupter (GFI) modules, and a line supervisory module is provided for line fault protection.

2. Discussion of the Prior Art

Conventional Ground Fault Circuit Interrupter (GFCI) devices are designed to trip in response to the detection of a ground fault condition at an AC load. Generally, the ground fault condition results when a person comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side of the AC load is being diverted to ground. When such an imbalance is detected, a circuit breaker within the GFCI device is immediately tripped to an open condition, thereby opening both sides of the AC line and removing all voltages from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differential current when a line-to-ground fault occurs.

Although GFCI receptacles of the type described above can provide useful protection against electrical shock hazards, they are designed to trip only in response to a ground fault condition and not in response to other types of conditions which can also be dangerous. For example, although a broken neutral conductor in an AC power source will de-energize the load, the line side of the AC source is still energized and can create a shock hazard at the load. A conventional GFCI device will not detect this condition, since the broken neutral conductor disables the control circuitry within the GFCI device and renders it incapable of tripping.

Portable GFCI devices have been designed for use in situations where the available AC power supply circuit does not include a central or receptacle-type GFCI device. These portable devices may be incorporated into line cords, extension cords or plug-in units, and are often used with power tools and other types of potentially hazardous power equipment at construction sites and the like.

Temporary branch power, as is frequently employed at temporary construction sites, provides and utilizes temporary electrical power and lighting wiring methods which may be of a class less than would be required for a permanent installation.

However, the National Electrical Code, as implemented by OSHA (Occupational Safety and Health Administration) requires that all 15 and 20 amp receptacle outlets on single phase circuits for construction sites have approved ground fault circuit protection for personnel. Accordingly, OSHA requires all temporary branch power systems to be GFI protected.

Two common problems can occur at construction sites with power supply cables that feed portable power boxes. Abuse or mis-wiring can cause 1) reversed power lines ($L_1$ or $L_2$) and neutral (N) or 2) an open neutral (N). These two problems can be dangerous when using a single pole GFI/ breaker in portable power boxes, as either one of these problems can deprive workers of needed GFI protection.

For instance, when the neutral (N) and line 1 ($L_1$) are reversed and should a fault occur, the neutral is opened, not line 1 ($L_1$), and the fault current still flows. The worker is unprotected. It is also possible under these circumstances to have 240 V supplied to a 125 V receptacle which creates an additional problem by possibly damaging the GFCI which would eliminate the protection thereof and present a potential danger.

Under circumstances when the neutral (N) is open, power is being fed to the receptacles, but power is not being fed to the neutral (N) terminal and the single pole GFI circuit breaker will not trip. The worker can be subjected to line voltage and thus be unprotected. From these two examples, it is easy to see the potential danger in using single pole GFI/circuit breakers in portable equipment.

SUMMARY OF THE INVENTION

Accordingly, it is a primary object of the present invention to provide a power distribution unit with individual GFI modules and a line supervisory circuit.

A further object of the subject invention is the provision of a power distribution box wherein individual outlets (120–125 VAC or 240–250 VAC) are protected by individual Ground Fault Interrupter (GFI) modules, and a line supervisory module is provided for line fault protection.

In accordance with the teachings herein, the present invention provides a power distribution unit for supplying temporary branch power. The power distribution unit has a 240–250 VAC input with at least input power line conductors L1 and L2, a neutral conductor N, and a ground conductor G. A supervisory circuit checks that the 240–250 VAC input is properly connected to the power distribution unit by requiring that the input voltage exceeds a supervisory circuit threshold voltage substantially greater than 120–125 volts. When that occurs, a contactor is enabled by the supervisory circuit to close first and second contacts therein to pass the 240–250 VAC on lines L1 and L2 therethrough to a 240–250 VAC ground fault interrupter protected circuit breaker outlet. Moreover, a plurality of 120–125 VAC GFI module outlets are connected across one of lines L1 and L2 at the output of the supervisory circuit and the neutral conductor N which bypasses the contactor.

In greater detail, the supervisory circuit includes a diode bridge circuit connected across the power line conductors L1 and L2 to convert a 240–250 VAC input to 240–250 VDC. A voltage threshold means is connected in series with a relay means across the 240–250 VDC, such that the voltage threshold means ensures that the voltage required to operate the relay means is substantially greater than 120–125 VDC. In greater detail, the voltage threshold means comprises a zener diode means, and in particular first and second series connected zener diodes. The relay means comprises first relay operated contacts to activate the contactor, and second relay operated contacts to bypass the neutral conductor N around the contactor to provide a neutral connection for the 240–250 GFCI's electronics.

The neutral connector N passed through the second relay operated contacts passes directly to the 240–250 VAC ground fault interrupter protected circuit breaker. The contactor only includes first and second contacts for the power line conductors L1 and L2, thus eliminating the expense of a three contact model. A plurality of 120–125 ground fault interrupter modules are connected across L1 and neutral conductor N, and similarly a plurality of 120–125 VAC ground fault interrupter modules are connected across power line L2 and neutral conductor N.

BRIEF DESCRIPTION OF THE DRAWINGS

The foregoing objects and advantages of the present invention for a power distribution unit with individual GFI modules and a line supervisory circuit may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
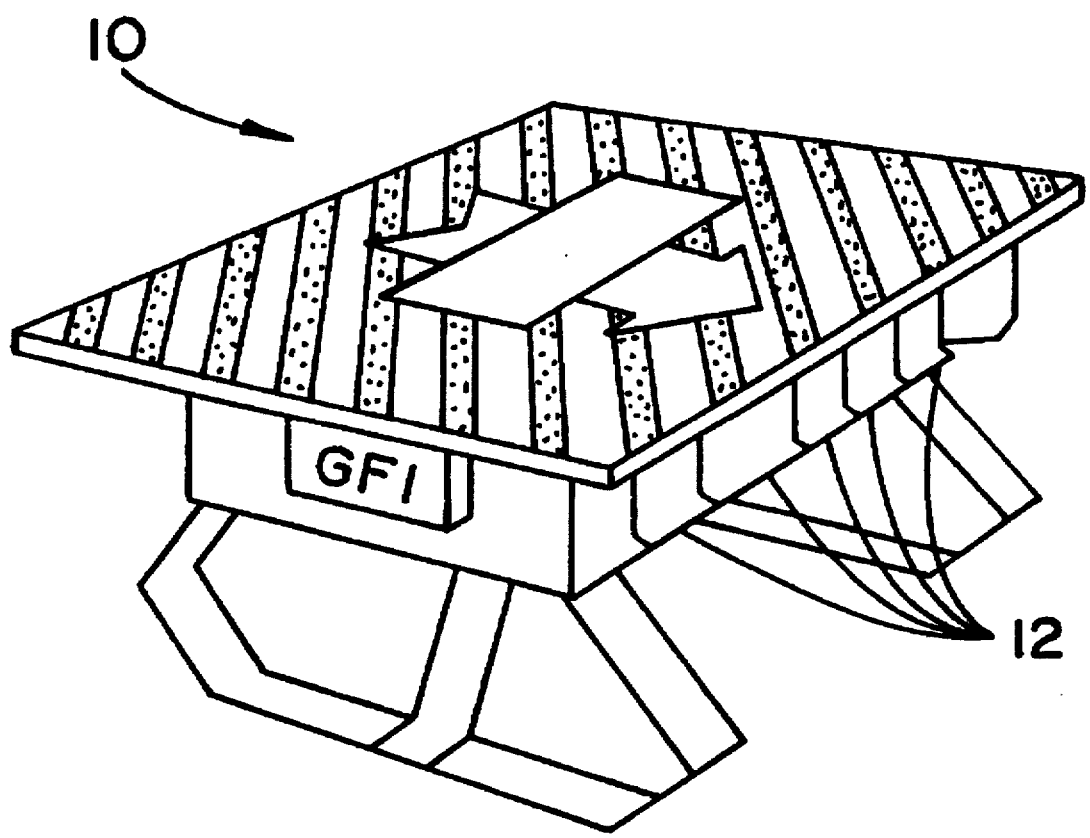
FIG. 1 illustrates a perspective view of an exemplary embodiment of a portable power distribution unit as it may be used at a construction site, equipped pursuant to the present invention with individual GFI modules and a line supervisory circuit.

Referring to the drawings in detail, FIG. 1 illustrates a perspective view of an exemplary embodiment of a portable power distribution unit 10 as it may be used at a construction site, equipped pursuant to the present invention with individual GFI modules and a line supervisory circuit, for providing 120–125/240–250 VAC power thereat.

A power distribution unit 10 can typically come equipped with 7 receptacles (6–20 amp 120–125 V amp and 1–30 amp 240–250 V), to provide maximum flexibility in providing temporary power on the job site. The power distribution unit 10 is built ruggedly to take construction site abuse. The circuit breakers, the power inlet, the power outlet, and all seven receptacles are equipped with individual lift. covers 12 to guard against the weather and abuse.

Figure 2:
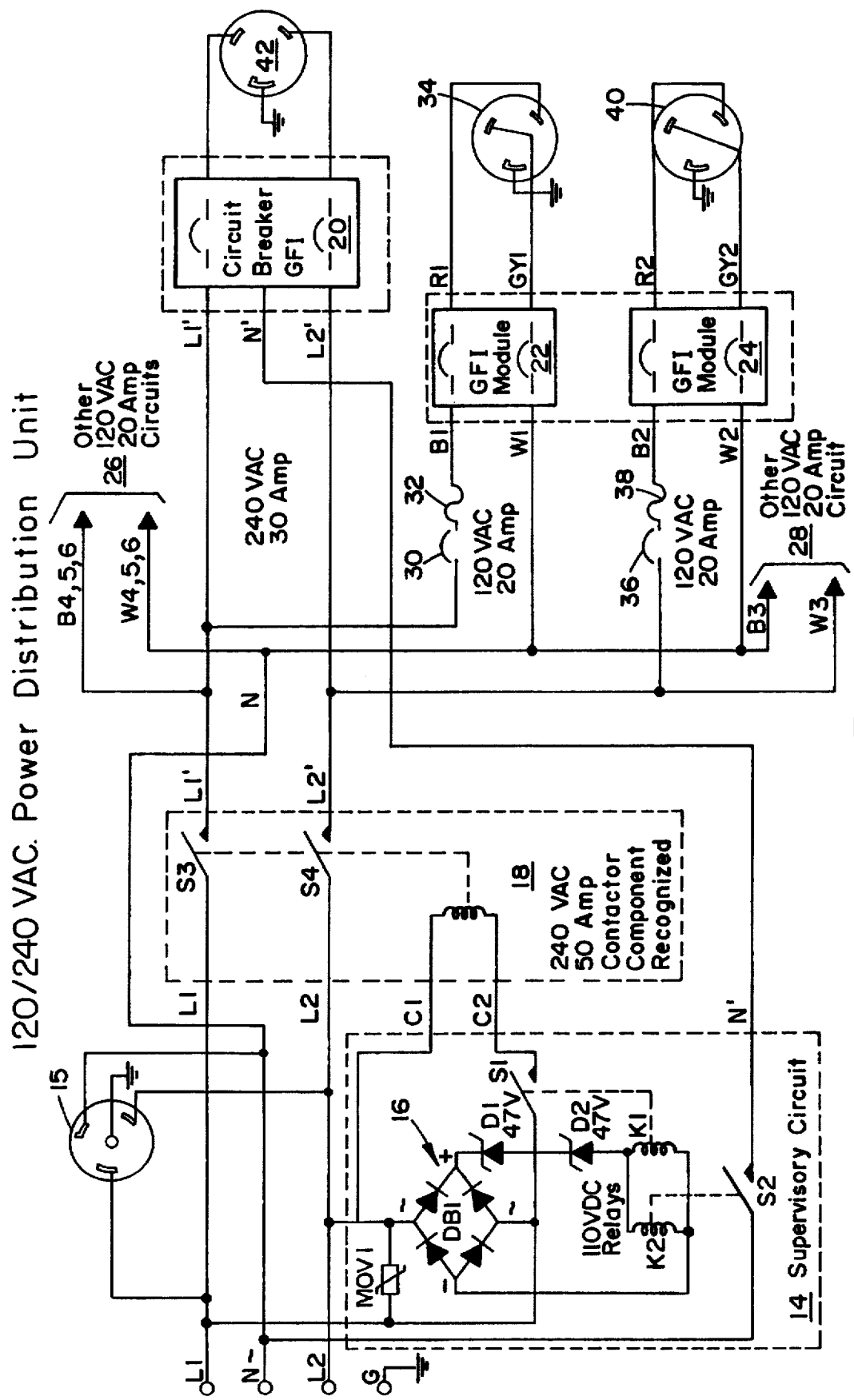
FIG. 2 is an electrical schematic circuit for the power distribution unit of FIG. 1, which includes electrical outlets with individual GFI modules and a line supervisory circuit which ensures that the circuit is properly wired to a 240 VAC power supply.

FIG. 2 is an electrical schematic circuit for the power distribution unit 10 of FIG. 1, which includes electrical outlets with individual GFI modules, described in detail hereinbelow, and a line supervisory circuit 14 which ensures that the circuit is properly wired to a 240–250 VAC power supply. As is typical in the art, an input power line includes electrical conductors L1 and L2, a center tap neutral conductor N between line phases L1 and L2, and a ground conductor G.

In the illustrated embodiment, the input power line is connected directly to a 240–250 V outlet 15, connected upstream of the circuits of the present invention. The outlet 15 can provide electrical power to downstream power distribution units, without providing GFI protection therefor.

The input power line is connected to a supervisory circuit 14, which includes a full wave rectifier diode bridge 16 connected across the terminals marked − and +. The input to the supervisory circuit also includes an electrical surge protection element MOV1 connected directly across the electrical lines L1 and L2 at the input, which is an electrical limiter to provide protection against undesired voltage surges.

When the circuit is connected and wired properly to a 240–250 AC input, a 240–250 VDC output is produced by the bridge circuit 16 across the series arrangement of first and second zener diodes D1 and D2 with parallel connected first and second 110 VDC relays K1 and K2. The relays K1 and K2 each control respectively contacts S1 and S2. In an alternative embodiment, one relay K1 could operate both contacts S1 and S2. Also, in embodiments with only 120–125 VAC outlets, the second contact S2 is not required. The series coupled zener diodes D1 and D2 require at least 96 V to conduct, leaving (for a lower 240 V input) 240 V−96 V=144 V to operate relays K1 and K2, which in one embodiment require >135 V to operate.

When relays K1 and K2 are activated, relay K1 closes contacts S1 to connect the 240–250 VAC across lines L1 and L2 across a 240–250 VAC contactor 18 to close the contacts S3 and S4 therein, and relay K2 closes contacts S2 to connect the neutral line N to a neutral line N' leading to a 240 VAC circuit breaker GFI 20. Accordingly, only a correctly wired power input will supply >135 V to operate relays K1 and K2, while an incorrectly wired power input would ordinarily supply only up to 120–125 V. The relays K1 and K2 are selected to require at the input a voltage well above 120–125 VDC, in view of the fact that an improperly wired input connection will generally supply no more that a 120–125 VDC at the output of bridge 16.

Contacts S1, when closed, apply the 240–250 VAC input across lines L1 and L2 to the contactor 18 to close the contactor contacts S3 and S4 to apply the 240–250 VAC across lines L1 and L2 to lines L1' and L2' and to the remainder of the circuit of the power distribution unit.

Contacts S2, when closed, connect the neutral line N to a neutral line N' connected to a 240–250 VAC Circuit Breaker GFI module 20.

It should be noted that with the circuit as described, the 240–250 VAC, 50 amp contactor 18 requires only two contacts, as opposed to a more expensive contactor with three contacts. The separate relay K2 and contacts S2 switch the neutral line N to connect it or not to the single 240–250 VAC, 30 amp circuit breaker GFI 20. The neutral line N also bypasses contactor 18, extending to 120–125 VAC GFI modules 22 and 24 and also to lines extending at 26 and 28 to other 120–125 VAC GFI modules, not shown.

When contacts S3 are closed, the 120–125 VAC across line L1 and neutral line N is supplied through a circuit breaker 30 and a 20 amp fuse 32 to a GFCI module 22 which supplies the 120–125 VAC to a GFCI protected 120–125 VAC outlet 34. Similarly, contacts S4, when closed, apply the 120–125 VAC across line L2 and neutral line N through a circuit breaker 36 and a 20 amp fuse 38 to the GFCI module 24 which supplies the 120–125 VAC to a 120–125 VAC outlet 40.

When contacts S3 are closed, the 120–125 VAC across line L1 and neutral line N is also available to other similar 120–125 VAC circuits at output lines 26. Likewise, contacts S4, when closed, apply the 120–125 VAC across line L2 and neutral line N to other similar 120–125 VAC circuits at output lines 28.

When contacts S2, S3 and S4 are closed, circuit breaker GFI module 20 supplies 240–250 VAC to a 240–250 VAC outlet 42.

Portable power distribution boxes 10 pursuant to the present invention use a 3-pole interrupter, so that even with line reversal or a neutral breakage, the power distribution box 10 is not energized and the worker still receives protection.

One model of the power distribution box has self-contained GFI protection for its own 20 and 30 amp receptacles. A second model of the distribution box has self-contained GFI protection for all its 20 and 30 amp receptacles, and also provides GFI protection for the 50 amp power outlet 15, and thus provides downstream GFI protection for all subsequent boxes connected to the system. A third model of the power distribution box does not have its own GFI protection, but receives GFI protection when connected to a GFI protected 50 amp power outlet of an upstream model.

While several embodiments and variations of the present invention for a power distribution unit with individual GFI modules and a line supervisory circuit are described in detail herein, it should be apparent that the disclosure and teachings of the present invention will suggest many alternative designs to those skilled in the art.

What is claimed is:

1. A power distribution unit for supplying temporary branch power, comprising:
   a. a 240-250 VAC input having at least input power line conductors L1 and L2, a neutral conductor N and a ground conductor G;
   b. a supervisory circuit for checking that the 240-250 VAC input is properly connected to the power distribution unit by requiring that the input voltage exceeds a supervisory circuit threshold voltage substantially greater than 120-125 volts VAC;
   c. a contactor, enabled by the supervisory circuit, for closing first and second contacts therein to pass the 240-250 VAC on lines L1 and L2 therethrough to a 240-250 VAC ground fault interrupter protected circuit breaker outlet;
   d. wherein the neutral conductor N bypasses the contactor to provide a bypassed neutral conductor N;
   e. at least one 120-125 VAC GFI module outlet connected across one of lines L1 and L2 at the output of the supervisory circuit and the bypassed neutral conductor N.

2. A power distribution unit as claimed in claim 1, wherein the supervisory circuit includes a diode bridge circuit connected across power line conductors L1 and L2 to convert a 240-250 VAC input to 240-250 VDC, a voltage threshold means is connected in series with a relay means across the 240-250 VDC, such that the voltage threshold means ensures that the voltage required to operate the relay means is substantially greater than 120-125 VDC.

3. A power distribution unit as claimed in claim 2, wherein the voltage threshold means comprises a zener diode means.

4. A power distribution unit as claimed in claim 3, wherein the zener diode means comprises first and second series connected zener diodes.

5. A power distribution unit as claimed in claim 4, wherein the relay means comprises first relay operated contacts to activate the contactor, and second relay operated contacts to bypass the neutral conductor N around the contactor.

6. A power distribution unit as claimed in claim 5, wherein the neutral connector N passed through the second relay operated contacts passes directly to the 240-250 VAC ground fault interrupter protected circuit breaker.

7. A power distribution unit as claimed in claim 6, wherein the contactor only includes first and second contacts for the power line conductors L1 and L2.

8. A power distribution unit as claimed in claim 7, wherein a plurality of 120-125 VAC ground fault interrupter modules are connected across L1 and the bypassed neutral conductor N, and a plurality of 120-125 VAC ground fault interrupter modules are connected across power line L2 and the bypassed neutral conductor N.

9. A power distribution unit as claimed in claim 2, wherein the relay means comprises first relay operated contacts to activate the contactor, and second relay operated contacts to bypass the neutral conductor N around the contactor.

10. A power distribution unit as claimed in claim 9, wherein the neutral connector N passed through the second relay operated contacts passes directly to the 240-250 VAC ground fault interrupter protected circuit breaker.

11. A power distribution unit as claimed in claim 1, wherein the contactor only includes first and second contacts for the power line conductors L1 and L2.

12. A power distribution unit as claimed in claim 1, wherein a plurality of 120-125 VAC ground fault interrupter modules are connected across L1 and the bypassed neutral conductor N, and a plurality of 120-125 VAC ground fault interrupter modules are connected across power line L2 and the bypassed neutral conductor N.

* * * * *